US010320686B2

(12) United States Patent
Williams, Jr. et al.

(10) Patent No.: US 10,320,686 B2
(45) Date of Patent: Jun. 11, 2019

(54) LOAD BALANCING ELIGIBLE PACKETS IN RESPONSE TO A POLICING DROP DECISION

(71) Applicant: Cisco Technology, Inc., San Jose, CA (US)

(72) Inventors: John J. Williams, Jr., Pleasanton, CA (US); Mohammed Ismael Tatar, Kanata (CA); David Delano Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 160 days.

(21) Appl. No.: 15/372,330

(22) Filed: Dec. 7, 2016

(65) Prior Publication Data

US 2018/0159779 A1    Jun. 7, 2018

(51) Int. Cl.
| | |
|---|---|
| *H04L 12/823* | (2013.01) |
| *H04L 12/803* | (2013.01) |
| *H04L 12/813* | (2013.01) |
| *H04L 12/863* | (2013.01) |
| *H04L 12/947* | (2013.01) |
| *H04L 29/06* | (2006.01) |
| *H04L 12/707* | (2013.01) |
| *H04L 12/815* | (2013.01) |

(52) U.S. Cl.
CPC .............. *H04L 47/20* (2013.01); *H04L 45/22* (2013.01); *H04L 47/122* (2013.01); *H04L 47/125* (2013.01); *H04L 47/22* (2013.01); *H04L 47/32* (2013.01); *H04L 47/50* (2013.01); *H04L 49/25* (2013.01); *H04L 69/16* (2013.01)

(58) Field of Classification Search
CPC ......... H04L 47/20; H04L 69/16; H04L 47/32; H04L 47/125; H04L 47/50; H04L 45/28; H04Q 2213/13146
See application file for complete search history.

(56) References Cited

U.S. PATENT DOCUMENTS

| | | |
|---|---|---|
| 8,170,045 B2 | 5/2012 | Pan et al. |
| 2002/0176363 A1 | 11/2002 | Durinovic-Johri et al. |

(Continued)

OTHER PUBLICATIONS

Braden et al., "Recommendations on Queue Management and Congestion Avoidance in the Internet," RFC 2309, Apr. 1998, The Internet Society, Reston, VA, USA (seventeen pages).

(Continued)

*Primary Examiner* — Omer S Mian
(74) *Attorney, Agent, or Firm* — The Law Office of Kirk D. Williams

(57) ABSTRACT

One embodiment includes a packet switching device load balancing eligible packets in response to a policing drop decision. The packet switching device sends packets of a particular packet flow out of the packet switching device over a first path in the network towards a destination node; and in response to a policer discipline determining to drop a particular packet of the particular packet flow, switching from said sending packets over the first path to sending packets of the particular packet flow out of the packet switching device over a second path in the network towards the destination node (possibly by switching output queues associated with the two different paths), with the second path being different than the first path, and with the particular packet not being dropped but being sent out of the packet switching device towards the destination node.

12 Claims, 6 Drawing Sheets

(56) References Cited

U.S. PATENT DOCUMENTS

| | | | |
|---|---|---|---|
| 2005/0083845 A1 | 4/2005 | Compton et al. | |
| 2005/0094567 A1 | 5/2005 | Kannan et al. | |
| 2005/0144303 A1* | 6/2005 | Zhang | H04L 1/188 709/231 |
| 2006/0176894 A1 | 8/2006 | Oh et al. | |
| 2007/0070907 A1 | 3/2007 | Kumar et al. | |
| 2007/0248005 A1 | 10/2007 | Pan et al. | |
| 2013/0170342 A1* | 7/2013 | Alnuem | H04L 47/283 370/230 |
| 2013/0329577 A1* | 12/2013 | Suzuki | H04L 12/54 370/252 |
| 2014/0328175 A1* | 11/2014 | Pan | H04L 47/32 370/235 |
| 2017/0134283 A1* | 5/2017 | Iles | H04L 47/11 |
| 2017/0289048 A1* | 10/2017 | Chao | H04L 47/21 |

OTHER PUBLICATIONS

Briscoe et al., "Byte and Packet Congestion Notification," RFC 7141, Feb. 2014, The Internet Society, Reston, VA, USA (forty-one pages).

Le et al., "Differential Congestion Notification: Taming the Elephants," Proceedings of the 12th IEEE International Conference on Network Protocols (ICNP'04), Oct. 2004, IEEE Society, Piscataway, NJ (eleven pages).

Pan et al., "Approximate Fairness through Differential Dropping," ACM SIGCOMM Computer Communications Review, Apr. 2003, vol. 33, Issue 2, ACM Press New York, NY (seventeen pages).

W. Stevens, "TCP Slow Start, Congestion Avoidance, Fast Retransmit, and Fast Recovery Algorithms," RFC 2001, Jan. 1997, The Internet Society, Reston, VA, USA (six pages).

Kandula et al., "Dynamic Load Balancing Without Packet Reordering," ACM SIGCOMM Computer Communication Review, Apr. 2007, pp. 53-62, vol. 37, No. 2, ACM Press New York, NY.

"Congestion Management Overview," Cisco IOS Quality of Service Solutions Configuration Guide, Jan. 30, 2014, pp. QC83-QC116, Cisco Systems, Inc. San Jose, CA.

Communication of the Partial European Search Report, dated Nov. 16, 2017, EP Application 17183114.2, European Patent Office, Munich, Germany, (twenty-three pages).

Nichols et al., "Controlled Delay Active Queue Management," draft-ietf-aqm-codel-05, Oct. 31, 2016, The Internet Society, Reston, VA, USA (twenty-eight pages).

* cited by examiner

LOAD BALANCING ELIGIBLE PACKETS IN RESPONSE TO A POLICING DROP DECISION

TECHNICAL FIELD

The present disclosure relates generally to packet switching devices and other apparatus typically in a packet network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. In using such technology, traffic can occur which causes certain packets to be dropped in favor of other packets in a network in a congestion avoidance effort.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Figure 1:
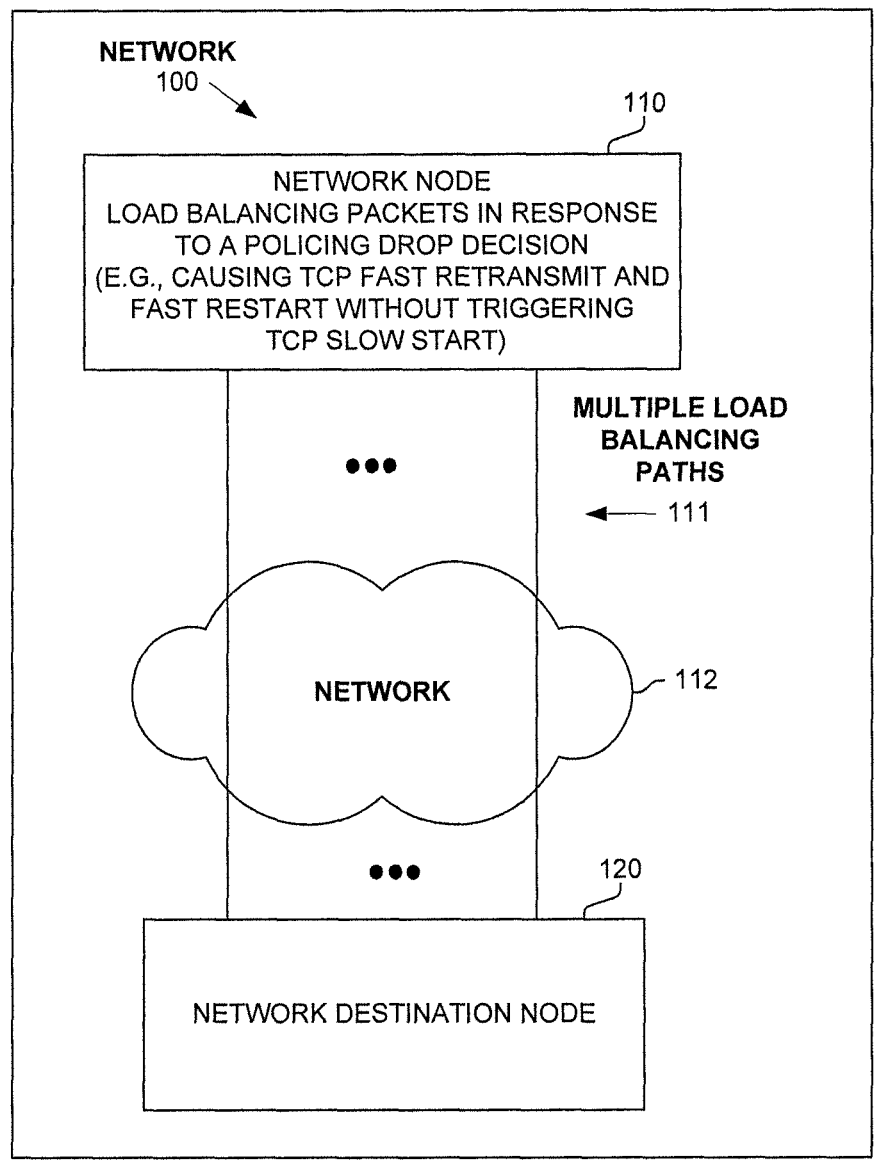
FIG. 1 illustrates a network operating according to one embodiment.

Disclosed are, inter alia, methods, apparatus, computer-storage media, mechanisms, and means associated with load balancing eligible packets in response to a policing drop decision.

One embodiment includes a method performed by a packet switching device in a network. Packets of a particular packet flow are sent out of the packet switching device over a first path in the network towards a destination node. In response to a policer discipline determining to drop a particular packet of the particular packet flow, the packet switching device switches from said sending packets over the first path to sending packets of the particular packet flow over a second path in the network towards the destination node, with the second path being different than the first path, and with the particular packet not being dropped but being sent out of the packet switching device towards the destination node.

One embodiment includes a method performed by a packet switching device in a network, with the packet switching device including a plurality of output queues, with each of the plurality of output queues associated with a different path in the network between the packet switching device and a destination node. One embodiment includes: load balancing packet traffic being sent from the packet switching device to the destination node including by enqueuing packets of said packet traffic in a first and a second output queues of the plurality of output queues, with packets of a particular packet flow being said enqueued in the first output queue. In response to a policer discipline determining to drop a particular packet of the particular packet flow, switching from said enqueuing packets of the particular packet flow into the first output queue to enqueuing packets of the particular packet flow into the second output queue, and with the particular packet not being dropped but being enqueued in the second output queue.

One embodiment includes an apparatus, such as, but not limited to a network node (e.g., packet switching device, server). In one embodiment, the apparatus includes: a plurality of output queues that enqueue packets that are sent over corresponding different paths from the apparatus to a destination node; memory that stores a flow hash data structure; one or more controllers that classify a particular packet of a particular flow of packets into an entry in the flow hash data structure and determines a first output queue of the plurality of output queues in which to enqueue the particular packet, that forwards the particular packet to a drop policy controller, that load balances the particular flow of packets to a second output queue of the plurality of output queues different than the first output queue in response to a returned particular packet, and that forwards the returned particular packet to the drop policy controller. A drop policy controller sends the particular packet as the returned particular packet to said one or more controllers in response to determining to drop the particular packet; and after receiving the returned particular packet from said one or more controllers causes the returned particular packet to be enqueued into the second output queue in response to a decision not to drop the second particular packet.

In one embodiment, the policer discipline is weighted random early detection (WRED), proportional integral controller enhanced (PIE), or Approximate Fair Drop (AFD). In one embodiment, prior to said switching, a determination is made that that the particular packet flow is eligible to be switched based on a round trip packet time between the packet switching device and the destination node. In one embodiment, a Transmission Control Protocol (TCP) session with a source node and the destination includes the particular packet flow, and said switching causes the TCP session to enter a fast retransmit and recovery (FRR) state and not the TCP slow start state.

2. Description

Disclosed are, inter alia, methods, apparatus, computer-storage media, mechanisms, and means associated with load balancing eligible packets in response to a policing drop decision. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

One embodiment uses a policing discipline to determine which flows of packets are "congested." Then, instead of dropping a packet for that flow, the network node load balances (e.g., switches the output queue which equates to switching the path to be taken by the packet) for that flow. In one embodiment the output port of the flow is reassigned at random, or another congestion management algorithm such as output queue congestion, Deficit Weighted Round Robin (DWRR), or another such methodology. As used herein a determination to drop by a policing disciple includes a determination to actually drop the packet or to mark the packet for potential dropping downstream.

FIG. 1 illustrates a network 100 operating according to one embodiment. Shown in FIG. 1 is network node 110 which load balances packet traffic sent to a network destination node 120 over multiple paths 111 through network 112. In one embodiment, this packet traffic is received by network node 110 from a source node (not shown). In one embodiment, the ultimate destination for this packet traffic is forwarded by network destination node 120 to another node (not shown). In other words, load balancing of packet traffic is performed between network nodes 110 and 120.

In one embodiment, network destination node 120 (or another destination node) terminates a Transmission Control Protocol (TCP) session of a packet flow. One embodiment avoids causing the TCP session to go into a slow start state because instead of dropping a packet of the flow as traditional policing methodologies do, the flow of packet traffic is switched at the transport layer to another of the established load balancing paths. Thus, one embodiment causes the TCP session to enter a fast retransmit and recovery (FRR) state without triggering TCP slow start, which improves performance of network nodes 110 and 120.

Figure 2:
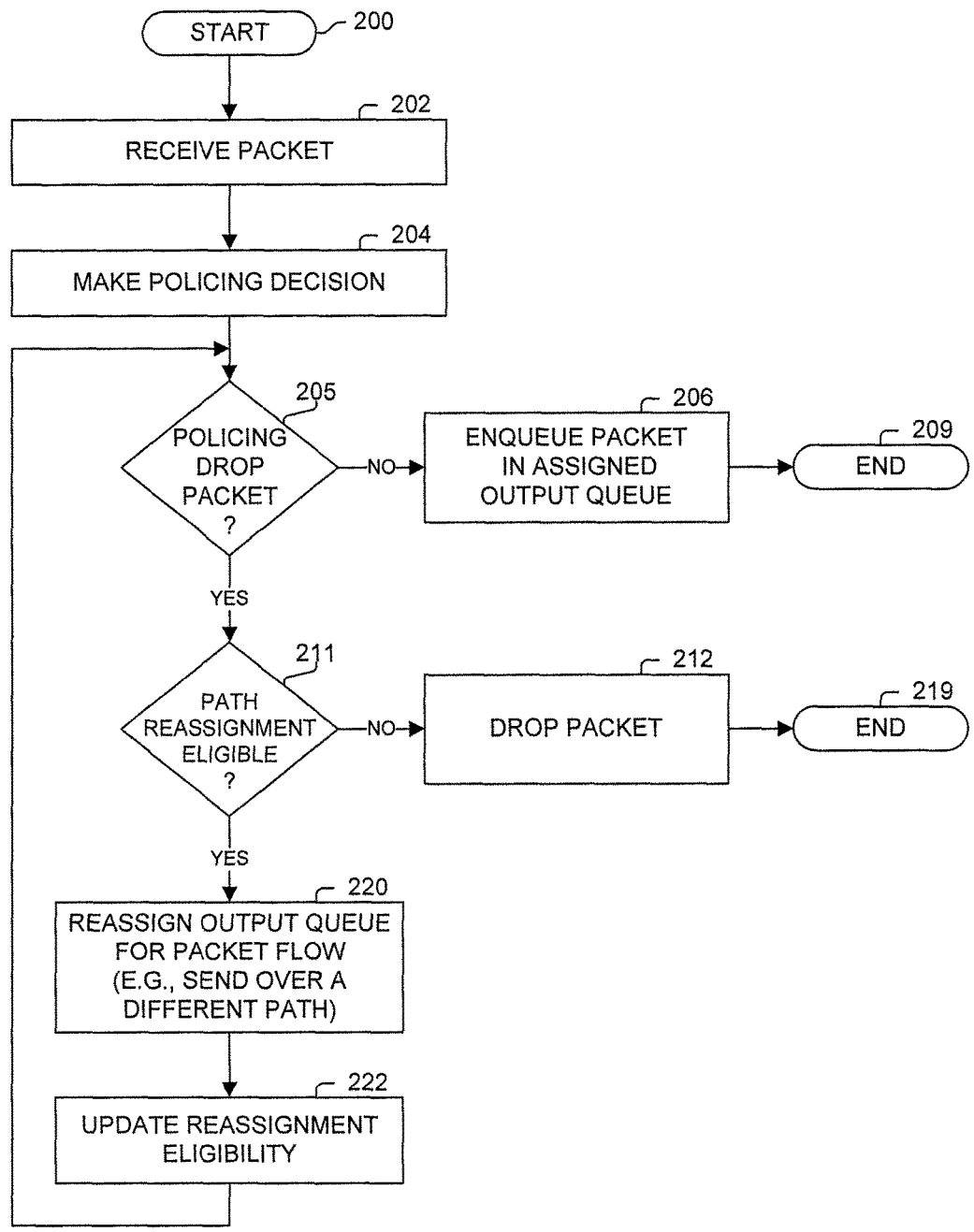
FIG. 2 illustrates a process according to one embodiment.

A process performed in one embodiment is illustrated in FIG. 2. Processing begins with process block 200. In process block 202, a packet is received by the network node. In process block 204, the policing discipline makes a policing decision. As used herein, a policing discipline makes a determination of whether or not to drop a packet probabilistically. In one embodiment, the policer discipline is weighted random early detection (WRED), proportional integral controller enhanced (PIE), or Approximate Fair Drop (AFD).

As determined in process block 205, if the policing decision is not to drop the packet, then in process block 206 the packet is enqueued in its assigned output queue for forwarding over its assigned path. Processing of the flow diagram of FIG. 2 is complete as indicated by process block 209.

Otherwise as determined in process block 205, the policing decision is to drop the packet, then processing proceeds to process block 211. As determined in process block 211, if the packet flow of the packet is eligible for path reassignment, then processing proceeds to process block 220; and if it is not eligible, processing proceeds to process block 212, wherein the packet is dropped (e.g., typically actually dropped, or possibly marked for dropping), and processing of the flow diagram of FIG. 2 is complete as indicated by process block 219. Otherwise, in process block 220, the output queue for the packet flow (including the packet) is reassigned (typically using some load balancing methodology), its reassignment eligibility is updated in process block 222, and processing returns to process block 205. In one embodiment, the reassignment eligibility is updated to limit the number of attempts to forward the packet from the packet switching device without causing it to be dropped in process block 212 (e.g., to avoid an infinite loop or many iterations as this implies that other paths are congested and the packet should be dropped). Further, one embodiment load balances a packet flow using a random determination, output queue bandwidth, shadow queues, output queue occupancy, or using another methodology.

Figure 3A:
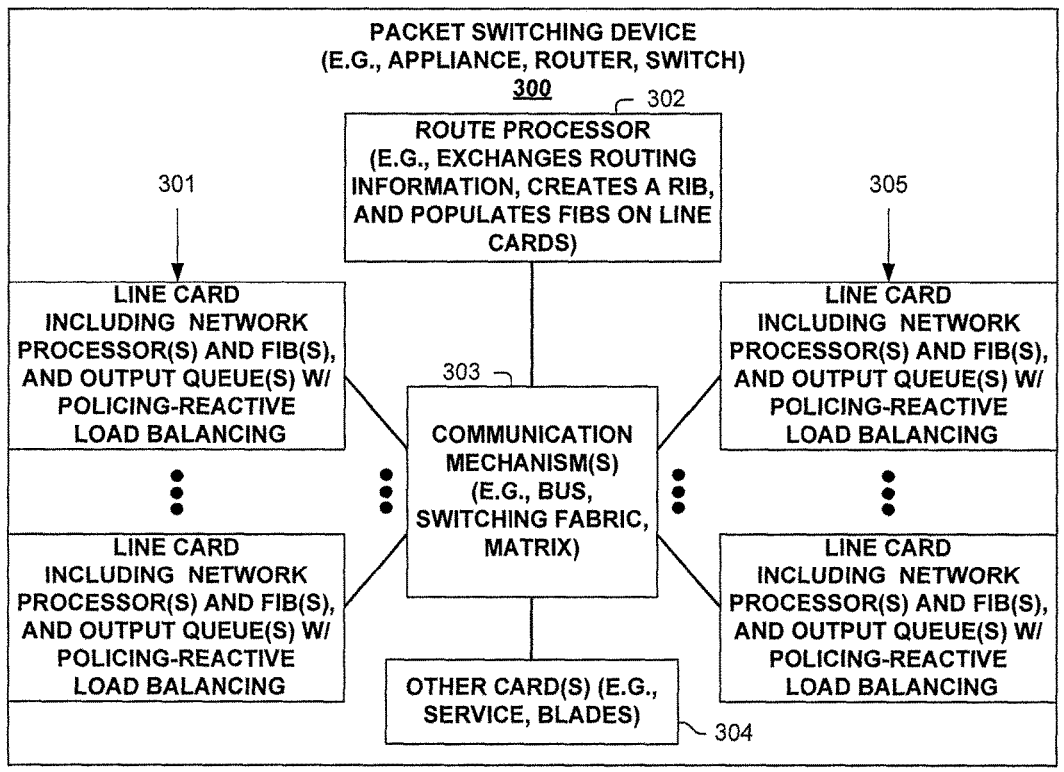
FIG. 3A illustrates a packet switching device according to one embodiment.

One embodiment of a packet switching device 300 is illustrated in FIG. 3A. As shown, packet switching device 300 includes multiple line cards 301 and 305, each typically with output queues and policing-reactive load balancing of packet traffic as described herein and one or more network interfaces for sending and receiving packets over communications links (e.g., possibly part of a link aggregation group), and with one or more processing elements that are used in one embodiment associated with load balancing eligible packets in response to a policing drop decision. Packet switching device 300 also has a control plane with one or more processing elements 302 for managing the control plane and/or control plane processing of packets associated with load balancing eligible packets in response to a policing drop decision. Packet switching device 300 also includes other cards 304 (e.g., service cards, blades) which include processing elements that are used in one embodiment to process packets associated with load balancing eligible packets in response to a policing drop decision, and some communication mechanism 303 (e.g., bus, switching fabric, matrix) for allowing its different entities 301, 302, 304 and 305 to communicate.

Line cards 301 and 305 typically perform the actions of being both an ingress and egress line card, in regards to multiple other particular packets and/or packet streams being received by, or sent from, packet switching device 300. In one embodiment, line cards 301 and/or 305 perform hash-based address matching on forwarding information bases (FIBs) to determine how to ingress and/or egress process packets. Even though the term FIB includes the word "forwarding," this information base typically includes other information describing how to process corresponding packets.

Figure 3B:
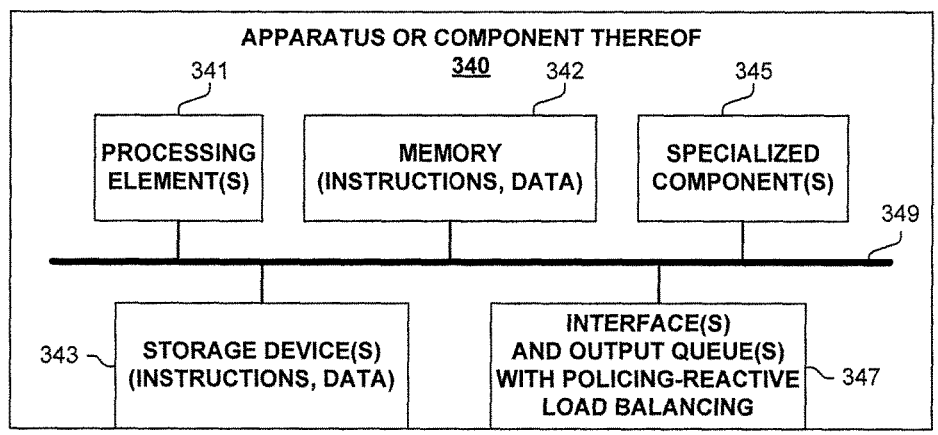
FIG. 3B illustrates an apparatus according to one embodiment.

FIG. 3B is a block diagram of an apparatus 340 used in one embodiment associated with load balancing eligible packets in response to a policing drop decision. In one embodiment, apparatus 340 performs one or more processes, or portions thereof, corresponding to one of the flow diagrams illustrated or otherwise described herein, and/or illustrated in another diagram or otherwise described herein.

In one embodiment, apparatus 340 includes one or more processor(s) 341 (typically with on-chip memory), memory 342, storage device(s) 343, specialized component(s) 345 (e.g. optimized hardware such as for performing lookup and/or packet processing operations, etc.), and interface(s) 347 for communicating information including output queues and policing-reactive load balancing of packet traffic as described herein (e.g., sending and receiving packets, user-interfaces, displaying information, etc.), which are typically communicatively coupled via one or more communications mechanisms 349 (e.g., bus, links, switching fabric, matrix), with the communications paths typically tailored to meet the needs of a particular application.

Various embodiments of apparatus 340 may include more or fewer elements. The operation of apparatus 340 is typically controlled by processor(s) 341 using memory 342 and storage device(s) 343 to perform one or more tasks or processes. Memory 342 is one type of computer-readable/computer-storage medium, and typically comprises random access memory (RAM), read only memory (ROM), flash memory, integrated circuits, and/or other memory components. Memory 342 typically stores computer-executable instructions to be executed by processor(s) 341 and/or data which is manipulated by processor(s) 341 for implementing functionality in accordance with an embodiment. Storage device(s) 343 are another type of computer-readable medium, and typically comprise solid state storage media, disk drives, diskettes, networked services, tape drives, and other storage devices. Storage device(s) 343 typically store computer-executable instructions to be executed by processor(s) 341 and/or data which is manipulated by processor(s) 341 for implementing functionality in accordance with an embodiment.

Figure 4A:
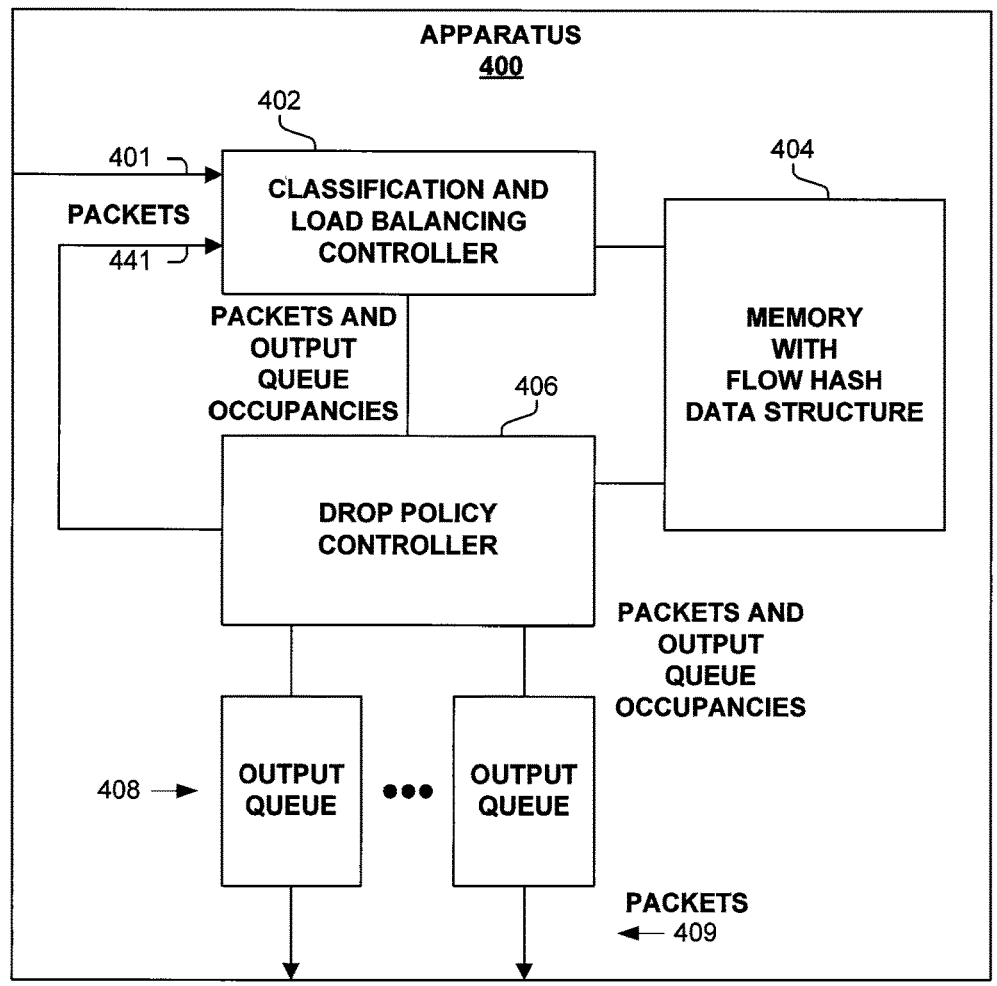
FIG. 4A illustrates an apparatus according to one embodiment.

FIG. 4A illustrates an apparatus 400, typically including in a network node (e.g., packet switching device, server, etc.). As shown, classification and load balancing controller 402 receives external packets 401 (e.g., new packets), and packets 441 from drop policy controller 406 (e.g., packets determined to be dropped but are currently eligible to be reassigned to another output queue/path). As used herein, drop policy is equivalent to a policing discipline.

In one embodiment, classification and load balancing controller 402 classifies a particular packet (401, 441) of a particular flow of packets into an entry in the flow hash data structure stored in memory 404 and determines a first output queue of output queues 408 in which to enqueue the particular packet stored in the entry.

Figure 4B:
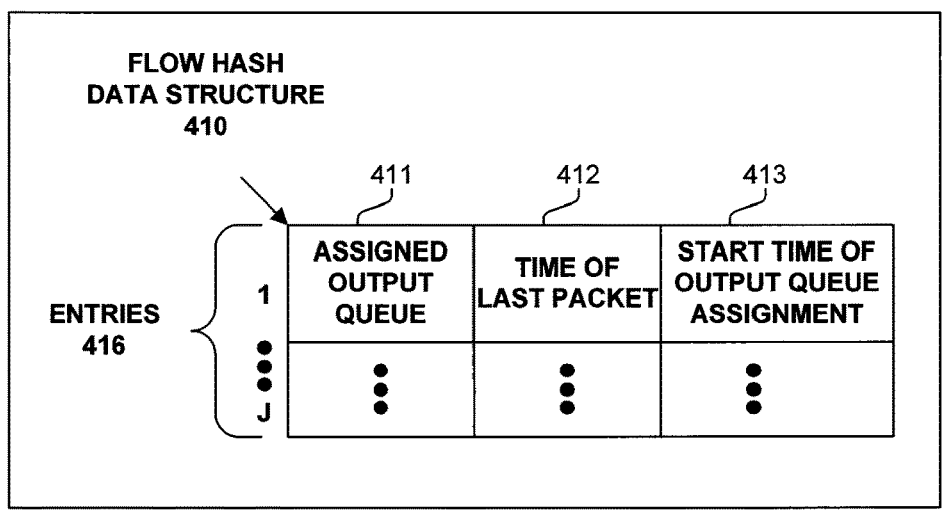
FIG. 4B illustrates a flow hash data structure according to one embodiment.

One embodiment of a flow hash data structure is illustrated in FIG. 4B. The terms "flow" and "flow hash" are used interchangeably herein, thus avoiding a limiting definition of a packet flow identified by a five-tuple. Rather, multiple five-tuple packet flows are typically hashed into a same entry 416 of flow data structure 410. As shown, each entry 416 includes an assigned output queue 411 (e.g., corresponding to a particular path); a time of last packet 412 in which the packet of the flow hash was processed by apparatus 400 (of FIG. 4A); and a start time of the output queue assignment 413 (e.g., the time the current output queue specified in field 411 was assigned).

Classification and load balancing controller 402 (of FIG. 4A) then forwards the particular packet typically along with the corresponding information retrieved from the flow hash data structure (to eliminate a potential lookup operation to retrieve this information by drop policy controller 406 from memory with flow hash data structure 404).

Drop policy controller 406 makes a drop policy decision using a policing discipline. The packet is provided to its corresponding output queue (e.g., based on the information retrieved from memory 404 with flow hash data structure) if the resulting policing decision is not to drop the packet. The packet is dropped if the resulting policing decision is to drop the packet and it is not eligible to be reassigned to another output queue 408. The packet is returned as packet 441 to classification and load balancing controller 402 if the resulting policing decision is to drop the packet and it is eligible to be reassigned to another output queue 408.

Figure 4C:
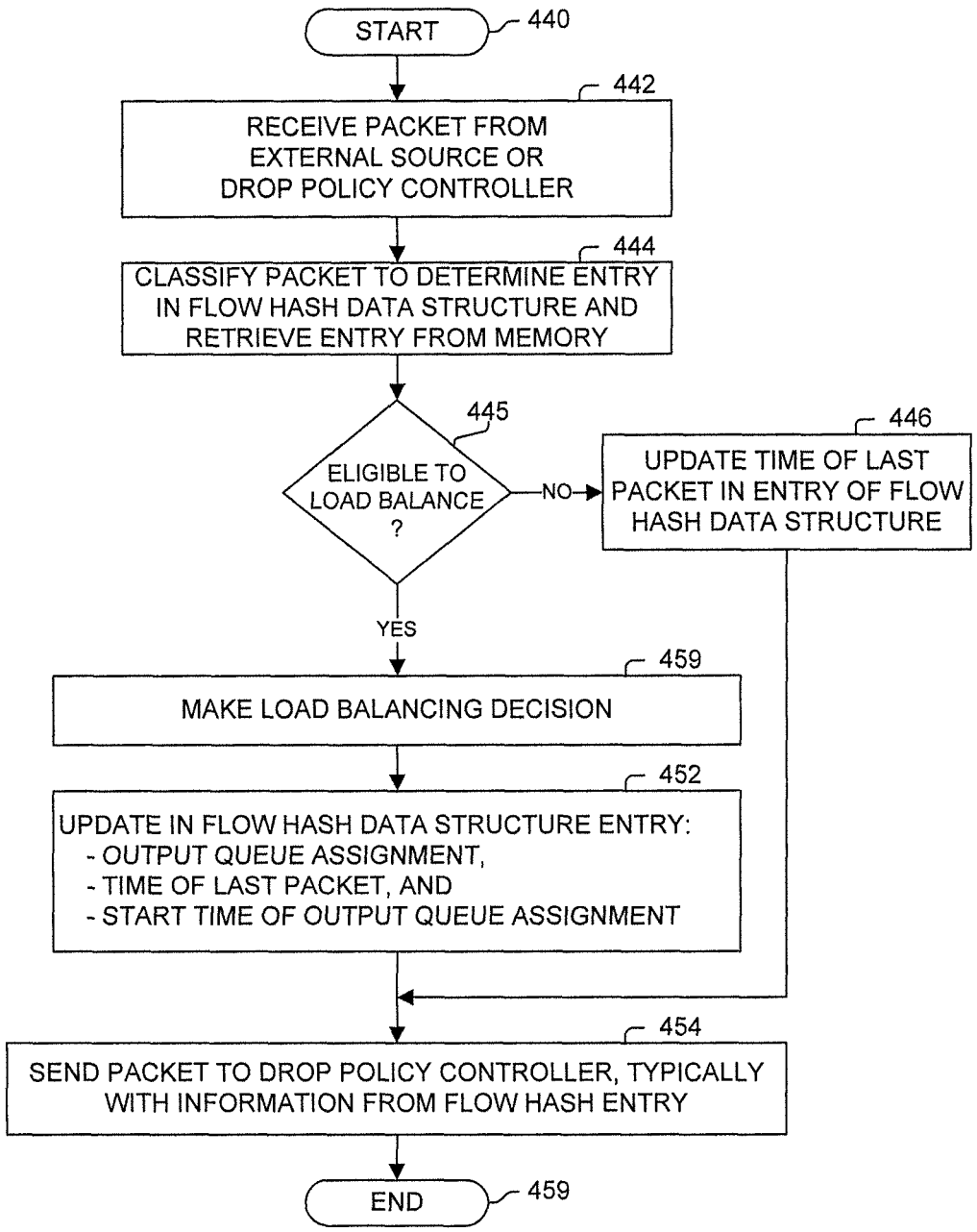
FIG. 4C illustrates a process according to one embodiment.

FIG. 4C illustrates a process performed in one embodiment by a controller (e.g., classification and load balancing controller 402 of FIG. 4A in one embodiment). Processing begins with process block 440. In process block 442, the packet is received from an external source or a drop policy controller (e.g., drop policy controller 406 of FIG. 4A in one embodiment). Next, in process block 444, the packet is classified to determine its corresponding entry in a flow hash data structure, which is retrieved from the data structure in memory.

As determined in process block 445, if the packet/packet flow is not eligible to be load balanced, then processing proceeds to process block 446, wherein the time of last packet is updated in the flow hash data structure in its corresponding entry, and processing proceeds to process block 454. In one embodiment, the eligibility determination is based on whether the packet is associated with metadata indicating it is being returned from the drop policy controller (or via some mechanism to indicate that it is being returned for load balancing). In one embodiment, the eligibility determination is also based on whether the current time minus the time of last packet for the packet flow as stored in the flow hash data structure entry is greater than the round-trip time (RTT) to the network destination node (e.g., the node terminating the TCP session). In this situation, there is a large enough gap in the traffic of the packet flow that it can be load balanced to a new output port/path without causing the TCP session to enter a slow start state, but rather to enter a fast retransmit and recovery (FRR) state.

As determined in process block 445, if the packet flow is eligible to be load balanced, then processing proceeds to process block 459, wherein a load balancing decision is made to determine the output queue/path for the packet/packet flow (which could be the same as the previous one in one embodiment). Then, in process block 452, the corresponding entry in the flow hash data structure is updated with the output queue assignment, the time of last packet, and the start time of the output queue assignment.

Processing continues with process block 459 wherein the packet is sent to the drop policy controller, typically with the information from the corresponding entry in the flow hash table. Processing of the flow diagram of FIG. 4C is complete as indicated by process block 459.

Figure 4D:
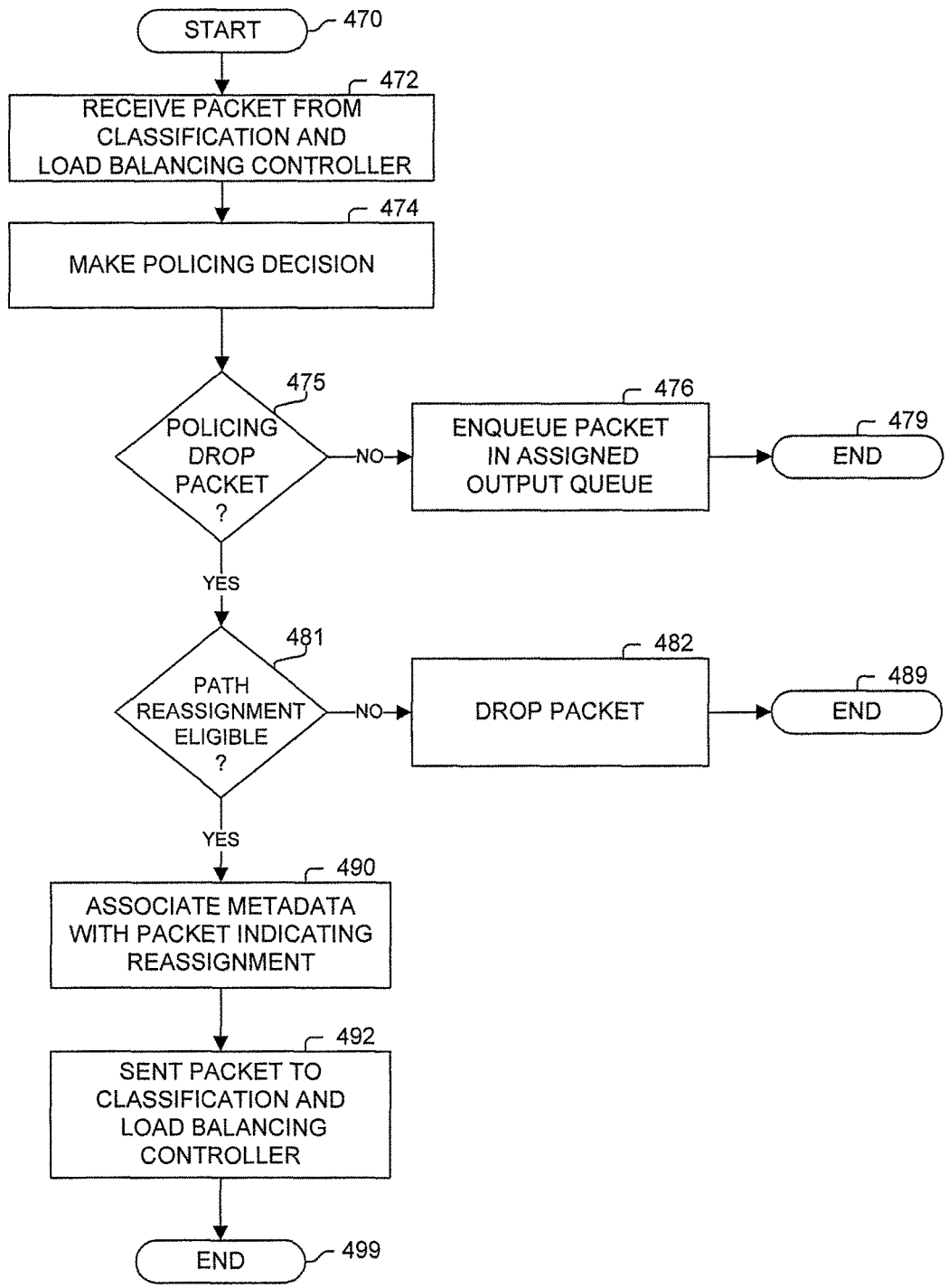
FIG. 4D illustrates a process according to one embodiment.

FIG. 4D illustrates a process performed in one embodiment by a drop policy controller (e.g., drop policy controller 406 of FIG. 4A in one embodiment). Processing begins with process block 470. In process block 472, a packet and typically information from its corresponding entry in the flow hash data structure. In process block 474, a policing decision is made.

As determined in process block 475, if the policing decision is not to drop the packet, then in process block 476 the packet is enqueued in its assigned output queue, and processing of the flow diagram of FIG. 4D is complete as indicated by process block 479.

Otherwise, as determined in process block 475, if the policing decision is to drop the packet, then processing proceeds to process block 481. As determined in process block 481, if the assigned output queue/path of the packet is not eligible to be reassigned, the packet is dropped in process block 482 and processing of the flow diagram of FIG. 4D is complete as indicated by process block 489.

In one embodiment, the eligibility determination is based on whether the current time minus the start time of the output queue assignment for the packet flow as stored in the flow hash data structure entry is greater than the roundtrip time (RTT) to the network destination node (e.g., the node terminating the TCP session). In this situation, there has been a large enough time since the last reassignment of the output queue/path for the packet flow so that it can be load balanced to a new output port/path without causing the TCP session to enter a slow start state, but rather to enter a fast retransmit and recovery (FRR) state. This decision prevents too many changes in the output port/path.

Otherwise, as determined in process block 481, if the assigned output queue/path of the packet is eligible to be reassigned, metadata indicating this reassignment is associated with the packet in process block 490. The packet and this indication is sent to the classification and load balancing controller in process block 492, and processing of the flow diagram of FIG. 4D is complete as indicated by process block 499.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:

performing operations by a packet switching device in a network, with said operations including:

sending packets of a particular packet flow out of the packet switching device over a first path in the network towards a destination node; and in response to a policer discipline determining to drop a particular packet of the particular packet flow and the packet switching device determining that the particular packet flow is eligible to be switched to a different path through the network, switching from said sending packets over the first path to sending packets of the particular packet flow out of the packet switching device over a second path in the network towards the destination node;

wherein the particular packet is not dropped and is sent out of the packet switching device towards the destination node;

wherein the first and the second paths refer to different paths between the packet switching device and the destination node; and wherein said determining that the particular packet flow is eligible to be switched includes determining that a difference between a current time and a time of last switching of paths between the packet switching device and destination node for the particular packet flow exceeds a round trip packet time between the packet switching device and the destination node.

2. The method of claim 1, wherein said operations include prior to and after said switching, the packet switching device transport layer load balancing packet traffic over a plurality of different paths between the packet switching device and the destination node, with the plurality of different paths including the first and the second paths.

3. The method of claim 1, wherein the particular packet is sent out of the packet switching device over the second path in the network towards the destination node.

4. The method of claim 1, wherein the policer discipline is weighted random early detection (WRED).

5. The method of claim 1, wherein the policer discipline is proportional integral controller enhanced (PIE).

6. The method of claim 1, wherein the policer discipline is Approximate Fair Drop (AFD).

7. The method of claim 1, wherein a Transmission Control Protocol (TCP) session with a source node and the destination node includes the particular packet flow, and said switching from said sending packets over the first path to sending packets of the particular packet flow out of the packet switching device over the second path in the network towards the destination node causes the TCP session to enter a fast retransmit and recovery (FRR) state and not the TCP slow start state.

8. A method, comprising:
performing operations by a packet switching device in a network, with the packet switching device including a plurality of output queues, with each of the plurality of output queues associated with a different path in the network between the packet switching device and a destination node, and with said operations including:
load balancing packet traffic being sent from the packet switching device to the destination node including by enqueuing packets of said packet traffic in a first and a second output queues of the plurality of output queues, with packets of a particular packet flow being said enqueued in the first output queue; and
in response to a policer discipline determining to drop a particular packet of the particular packet flow and the packet switching device determining that the particular packet flow is eligible to be switched to a different path through the network, switching from said enqueuing packets of the particular packet flow into the first output queue to enqueuing packets of the particular packet flow into the second output queue;
wherein the particular packet is not dropped and is enqueued in the second output queue and subsequently sent from the packet switching device; and
wherein said determining that the particular packet flow is eligible to be switched includes determining that a difference between a current time and a time of last switching of the particular packet flow from being enqueued into a different one of the plurality of output queues exceeds a round trip packet time between the packet switching device and the destination node.

9. The method of claim 8, wherein the policer discipline is weighted random early detection (WRED), proportional integral controller enhanced (PIE), or Approximate Fair Drop (AFD).

10. The method of claim 8, wherein a Transmission Control Protocol (TCP) session with a source node and the destination node includes the particular packet flow, and said switching from said enqueuing packets of the particular packet flow into the first output queue to enqueuing packets of the particular packet flow into the second output queue causes the TCP session to enter a fast retransmit and recovery (FRR) state and not the TCP slow start state.

11. An apparatus, comprising:
a plurality of output queues that enqueue packets that are sent over corresponding different paths from the apparatus to a destination node;
memory that stores a flow hash data structure;
one or more controllers that classify a particular packet of a particular flow of packets into an entry in the flow hash data structure and determines a first output queue of the plurality of output queues in which to enqueue the particular packet, that forwards the particular packet to a drop policy controller, that load balances the particular flow of packets to a second output queue of the plurality of output queues different than the first output queue in response to a returned particular packet, and that forwards the returned particular packet to the drop policy controller; and
a drop policy controller that sends the particular packet as the returned particular packet to said one or more controllers in response to determining to drop the particular packet; and after receiving the returned particular packet from said one or more controllers causes the returned particular packet to be enqueued into the second output queue in response to a decision not to drop the returned particular packet;
wherein the decision not to drop the returned particular packet includes determining that a difference between a current time and a time of last switching of the particular packet flow from being enqueued into a different one of the plurality of output queues exceeds a round trip packet time between the packet switching device and the destination node.

12. The apparatus of claim 11, wherein a Transmission Control Protocol (TCP) session with a source node and the destination node includes the particular packet flow, and switching from enqueuing packets of the particular packet flow into the first output queue to enqueuing packets of the particular packet flow into the second output queue causes the TCP session to enter a fast retransmit and recovery (FRR) state and not the TCP slow start state.

* * * * *